United States Patent [19]

McKinstry et al.

[11] 3,952,968
[45] Apr. 27, 1976

[54] TAPE TRANSPORT SYSTEM

[75] Inventors: Richard Bruce McKinstry, Northboro; Joseph Charles Godbout, Acton, both of Mass.

[73] Assignee: Data General Corporation, Southboro, Mass.

[22] Filed: Apr. 10, 1974

[21] Appl. No.: 459,816

[52] U.S. Cl. .................................. 242/182; 226/97
[51] Int. Cl.² .................. G11B 15/58; G11B 23/12
[58] Field of Search ........... 242/182, 183, 184, 185; 226/95, 97, 118, 91, 92

[56] References Cited
UNITED STATES PATENTS

| | | | |
|---|---|---|---|
| 3,075,716 | 1/1963 | Morgan............................... | 242/185 |
| 3,458,154 | 7/1969 | Kleist.................................. | 242/182 |
| 3,727,859 | 4/1973 | Dobransky et al.................. | 242/182 |
| 3,751,604 | 8/1973 | Calizzano et al. .................. | 242/182 |
| 3,791,607 | 2/1974 | Klang et al.......................... | 242/184 |

*Primary Examiner*—Leonard D. Christian
*Attorney, Agent, or Firm*—Jacob Frank

[57] ABSTRACT

A digital magnetic tape transport incorporates a pair of adjacent vacuum storage columns each with oppositely disposed closed and open ends, a magnetic head assembly defining a generally linear tape threading path along one side of the vacuum storage columns and substantially parallel to the vacuum columns lengthwise direction, a pair of tape storage reels mounted at a second side of the vacuum storage columns positioned along a line substantially parallel with the linear tape threading path, whereby a rear closed end of the vacuum column adjacent to a storage reel is tapered at an angle substantially tangent to the adjacent storage reel, allowing for: elimination of an idler roller; an improved take-up path, and; for easier manual threading of the tape. A similar tapered configuration is provided at the rear end of the second vacuum column also eliminating the necessity of an idler roller. The arrangement decreases the total number of idler rollers necessary for the overall tape path to in turn decrease the frictional contact of the tape encountered. At the same time, because of the V-shaped configurations at the rear walls where there are positioned relatively large apertures for supplying vacuum to the vacuum columns, the positioning of a central narrow common plenum is provided for thereby allowing for positioning adjacent elongated chambers with relatively small apertures for separately sensing vacuum in each vacuum column to determine a varying tape loop position.

9 Claims, 2 Drawing Figures

TAPE TRANSPORT SYSTEM

BACKGROUND OF THE INVENTION

1. Field of the Invention

The present invention relates to a web transport system employing a tape loop buffer between a tape driving mechanism and the tape storage reels, and more particularly, to the improvement of the tape path for a magnetic tape transport system.

2. Description of the Prior Art

Tape transport systems are presently employed in a large number of varying applications, including high performance digital magnetic tape systems operating in conjunction with moderate high speed data processing equipment. In such systems, it has become quite common to use tape buffering devices to provide for intermediate storage of tape sections sufficient to allow for temporary speed differences between the slower acting high inertia reels and the quick acting tape drive mechanisms.

In the use of these vacuum column tape drives, continuous efforts are being made to optimize the tape path through which the tape is unwound from one reel, buffered, and then passed through suitable guide means by a read/write amplifier and driven into another buffer and then rewound on the take-up reel. Clearly, one of the considerations involved in optimizing a tape path is to provide for a compact overall configuration in which a minimum amount of space is used. Other considerations include minimizing the contact surfaces of both sides of the tape and yet achieve maximum speed and dimensional characteristics.

SUMMARY

One of the objects of the present invention is to provide a compact front panel configuration having standard industry dimensions, employing a pair of vacuum chambers in a side-by-side relationship and arranged in parallel relation to a line crossing the axis of the take-up and supply reels, whereby opposite ends of the vacuum chambers adjacent to the mouth of the companion vacuum chamber are tapered to enhance the tape feed path for simultaneously reducing the number of roller guides necessary while retaining maximum speed dimensional characteristics and provide for convenient positioning of vacuum supply plenum anad plenums used for monitoring the tape loop position.

DESCRIPTION OF THE PREFERRED EMBODIMENT

Figure 1:
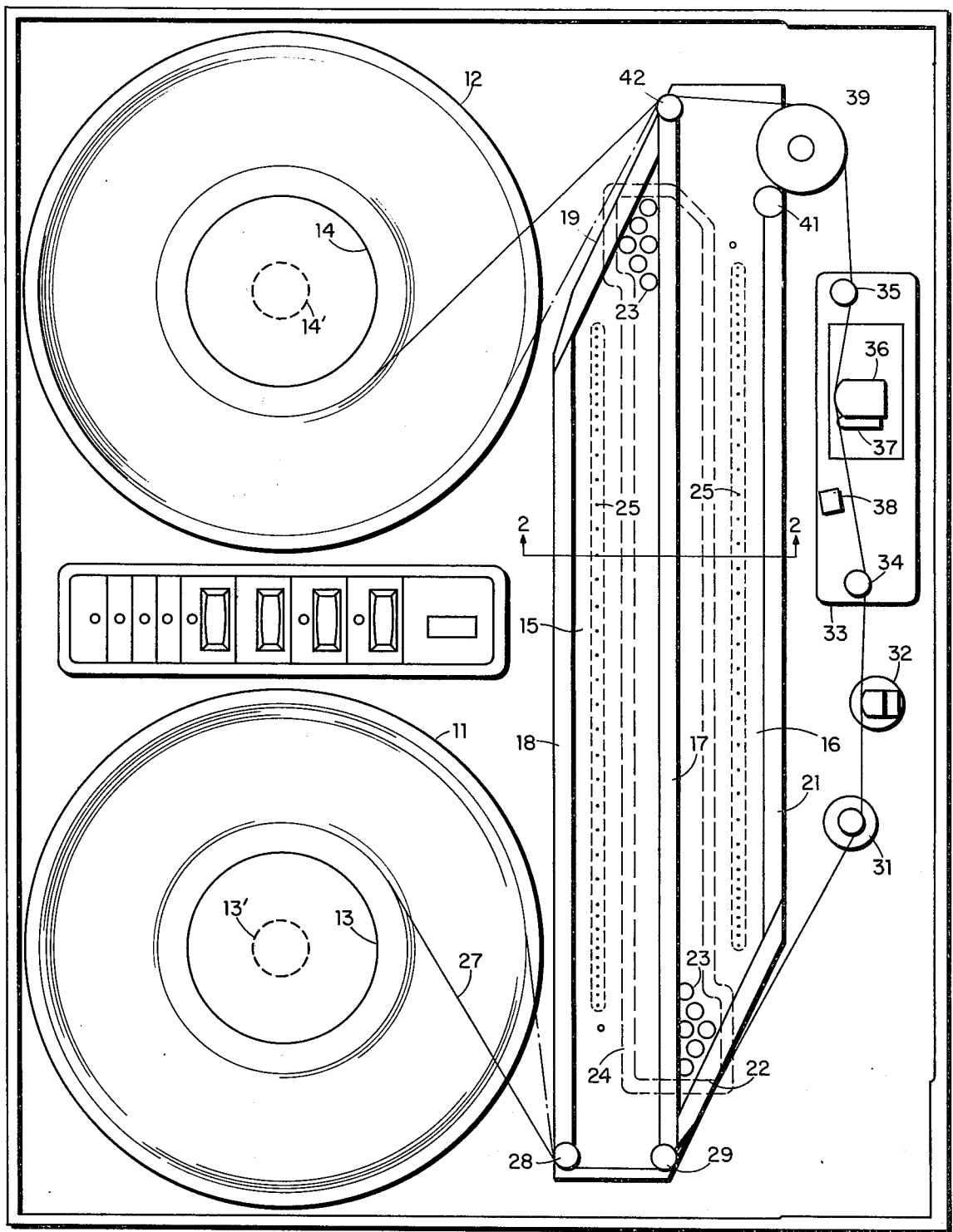
FIG. 1 is a plan view of a magnetic tape transport apparatus according to the present invention with the plenums shown in dashed lines.
Figure 2:
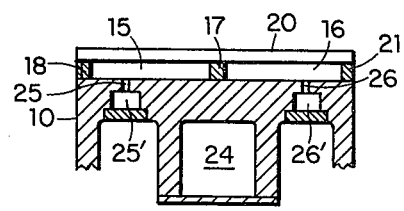
FIG. 2 is a cross-sectional view of the magnetic tape transport taken along line 2—2 of FIG. 1.

With reference to the drawings, there is shown in FIG. 1 a magnetic tape transport system mounted on a panel 10 generally including a tape supply reel 11 and tape take-up reel 12, the designations "supply" and "take-up" being used soley for convenience since such systems are commonly bidirectional. The supply and take-up reels are respectively mounted on hubs 13 and 14 connected to the drive shaft 13' and 14' of the separate drive motors. The panel 10 is of a size that conform to conventional equipment cabinets and with minicomputer and other data processing equipment.

In the present embodiment, situated to the right of the reels and parallel with a line running through the axis of both drive shafts 13' and 14', are a pair of vacuum column buffers 15 and 16 arranged side-by-side having a common wall 17. The sides of vacuum column 15 are further defined by another parallel side 18 and a tapered side 19 at the rear closed end of the column 15. The rear tapered wall 19 of the vacuum column 15 is further tapered at 19' to allow for easier manual threading of the tape into the take-up reel 12. The vacuum column buffer 16, in addition to the common wall 17, is further defined by another parallel side wall 21 and a tapered wall 22 at the rear closed end of the column. The bottom support wall of both columns is defined by panel 10 and a common top wall 20 to both columns is a transparent medium such as plexiglass connected to the side walls by suitable means.

At the rear of each of the vacuum column chambers are relatively large apertures 23 which are connected via a common plenum 24, represented by the dashed lines, to a common vacuum source. Arranged in a straight path along the length dimension of each vacuum column is a plurality of relatively small apertures 25 and 26, each group of operations connected to separate plenums 25' and 26' respectively, shown in dashed lines, positioned at opposite sides of the plenum 24. As is conventional, each plenum is separately connected to its own pressure transducer for monitoring the vacuum value in each column which is a function of the tape loop position so that the tape loop position in each vacuum column may be properly connected by a conventional servo system.

Due to the industry standard horizontal width of most mounting racks for the minicomputer area lying within a range of approximately nineteen inches and since industry compatible reels employed at one side of the frame are approximately 10½ inches in diameter with a clearance of approximately one-half inches on each side. This leaves approximately seven and one-half inches along the horizontal dimension for the vacuum columns, the tape head assembly and drive apparatus. In view of the above, it will be appreciated that engineering parameters become a very important factors in providing an economical compact unit having good mechanical design and a tape path involving miminum tape contact, without compromising but enhancing operational characteristics.

In following the tape threading path from the supply to the take-up reel, the tape 27 is first guided about idler rollers 28 and 29 at the mouth of the vacuum column 15, then is angled alongside the tapered rear wall of vacuum buffer 16 and guided about an idler roller 31, passed by a vacuum unit 32 for cleaning of the tape and, then routed into a tape head assembly 33. The tape head assembly comprises a pair of fixed guides 34 and 35 positioned at each side of a read/write head 36 having an erase head attachment 37. Between the read/write head 36 and guide 34, there is a conventional beginning of tape (BOT) sensor 38 for generating a signal when the beginning of a tape is detected.

After passing out of the head assembly 33, the tape is wrapped around a drive capstan, in just less than 180°, which is mounted at one side of the mouth of the vacuum column 16, again to reduce the total number of guides. A fixed guide 41 located just below the capstan is set into the vacuum column to prevent excess vertical movement of the tape when driven in the reverse direction. At the other side of the mouth of vacuum 16 is another idler roller 42. From the idler roller 42, the tape is threaded alongside the tapered rear wall portion of vacuum buffer 15 to be wrapped about the take-up reel 12. The tapered rear wall portion 19 terminates just below a horizontal center-line of the take-up reel and includes an addition tapered portion 19' to allow for earlier threading of the tape.

As will be noted, the angle of taper is such that, if extended, it would not intersect the adjacent take-up reel 12. It could, however, be tangential to the reel as a fully wound reel does not have tape wound to its periphery or circumference. This avoids the tape hitting the tapered wall. A preferable embodiment is that shown wherein the tapered wall is substantially tangent to the reel allowing the tape to avoid contact with the tapered wall 19 yet sufficient space to accumulate the relatively large apertures 23. The tapered rear wall 22 which also allows for elimination of an idler roller, is provided with a similar angle for aesthetic purposes and to simultaneously provide an equally dimensional V-shaped groove at the rear of vacuum column 16. This also allows for a uniformly shaped plenum 24 and less problems in manufacturing.

As is illustrated, the tapered rear walls obviate the necessity for additional idler rollers which otherwise would be necessary. Not only does the elimination of idler rollers otherwise adjacent to take-up reel 12 at the rear of vacuum column 15 reduce the contact surfaces with the tape, but in addition, the tapered arrangement allows for easier manual threading in the loading operation position which is enhanced by the further cut-away 19'. The idler roller eliminated at the rear of vacuum column 16 allows the tape to go directly from idler roller 29 to idler roller 31 positioned near the head assembly for stabilization of the tape passing through the head assembly.

It may be observed from the drawings, together with the description above, the compact arrangement and configuration of the vacuum chambers provides for other advantages in the tape transport system. Specifically, the apertures 23, which are contained within the rear V-shaped portion of each of the vacuum columns, allows for using a narrow central plenum 24 under the common wall 17 for applying vacuum, yet leaving adequate space at each side of plenum 24 for separate plenums respectively connected to the apertures 25 and 26 for monitoring the position of the tape loop in each of the vacuum columns. The use of separate monitoring plenums at the bottom side of each of the vacuum columns allows for better sensitivity and less design complexity e.g. as opposed to having these small apertures at one side or at the top of each of the vacuum columns.

What is claimed is:

1. In a digital magnetic tape transport having a pair of adjacent vacuum storage column means extending lengthwise in a first direction each with oppositely disposed closed and open ends, a magnetic head assembly defining a substantially linear tape threading path along one side of said vacuum storage column means and substantially parallel to the lengthwise direction thereof, a pair of tape reels adapted to be mounted at a second opposite side of said vacuum storage column means along a line parallel with said linear tape threading path, the improvement comprising:
   a tapered vacuum column means closed end adjacent the storage reel and along the path traveled by the tape between the storage reel and one of said vacuum columns, the angle of taper being such that the tapered end if extended would not intersect said adjacent storage reel, and
   wherein said second vacuum column means closed end is similarly tapered at an angle substantially parallel with the tapered angle at said first vacuum column means closed end.

2. A digital magnetic tape transport according to claim 1 wherein V-shaped portions are formed at each closed end of said vacuum column means each containing a plurality of relatively large apertures.

3. A digital magnetic tape transport according to claim 2 including a common plenum means running underneath said vacuum column means and open to said relatively large apertures.

4. In a digital magnetic tape transport system mounted on a standardized rectangular equipment frame having magnetic head assembly means positioned for defining a generally linear tape threading path along a first side of the frame, first and second reels mounted at a second opposite side of the frame, first and second elongated adjacent vacuum storage columns each with oppositely disposed closed and open ends, the vacuum columns positioned intermediate the drive shafts and said head assembly means and defining along their lengthwise direction substantially parallel center lines substantially parallel to said linear tape path, the centers of said drive shafts together defining a line substantially parallel to said linear tape path, a rear closed end of each vacuum column positioned adjacent to a front open end of the adjacent vacuum column, the improvement comprising:
   the first vacuum column closed end adjacent a reel receiving means being tapered from the adjacent vacuum column open end, the angle of taper being such that the tapered end, if extended, would not intersect the adjacent reel.

5. A digital magnetic tape transport according to claim 4 where said tapered column is of a V-shaped configuration, and including apertures adapted for connection to a vacuum source.

6. A digital magnetic tape transport according to claim 4 wherein said tapered portion is further inclined alongside the adjacent reel.

7. A digital magnetic tape transport according to claim 4 wherein the second vacuum column closed end is tapered at an angle parallel to said tapered first column.

8. A digital magnetic tape transport according to claim 7 wherein each of said vacuum columns includes, in V-shaped areas formed by the tapering, a plurality of relatively large apertures for connection to a common vacuum source.

9. A digital magnetic tape transport according to claim 8 including a common plenum running underneath said vacuum columns and open to said relatively large apertures.

* * * * *